United States Patent
Kelley et al.

(10) Patent No.: US 7,664,820 B2
(45) Date of Patent: Feb. 16, 2010

(54) RFID WIRELESS CONTROL OF INSTANT MESSAGING

(75) Inventors: Edward E. Kelley, Wappingers Falls, NY (US); Franco Motika, Hopewell Junction, NY (US); Tijs Y. Wilbrink, Voorburg (NL)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 10/906,992

(22) Filed: Mar. 15, 2005

(65) Prior Publication Data

US 2006/0212519 A1 Sep. 21, 2006

(51) Int. Cl.
*G06F 15/16* (2006.01)
*H04M 11/00* (2006.01)
*H04B 1/18* (2006.01)

(52) U.S. Cl. ............... 709/206; 709/204; 709/207; 709/227; 709/228; 709/249; 455/403; 455/421; 455/151.2; 455/20

(58) Field of Classification Search ......... 709/204–207, 709/227, 228, 246, 248, 249; 455/90.2, 95, 455/151.2, 403, 421, 439, 446, 518, 20
See application file for complete search history.

(56) References Cited

U.S. PATENT DOCUMENTS

| | | | |
|---|---|---|---|
| 6,088,450 A | 7/2000 | Davis et al. | |
| 6,108,028 A | 8/2000 | Skarbo et al. | |
| 6,374,145 B1 | 4/2002 | Lignoul | |
| 6,422,474 B1 | 7/2002 | Gossweiler, III et al. | |
| 6,430,604 B1 * | 8/2002 | Ogle et al. | 709/207 |
| 6,464,140 B1 | 10/2002 | Weigel | |
| 6,701,378 B1 | 3/2004 | Gilhuly et al. | |
| 6,874,037 B1 * | 3/2005 | Abram et al. | 709/248 |
| 6,931,454 B2 * | 8/2005 | Deshpande et al. | 709/248 |
| 7,016,978 B2 * | 3/2006 | Malik et al. | 709/246 |
| 7,185,059 B2 * | 2/2007 | Daniell et al. | 709/206 |
| 2001/0021950 A1 * | 9/2001 | Hawley et al. | 709/225 |
| 2002/0077080 A1 * | 6/2002 | Greene | 455/412 |
| 2002/0133595 A1 * | 9/2002 | Kimura et al. | 709/227 |
| 2003/0030670 A1 | 2/2003 | Duarte et al. | |
| 2003/0063052 A1 | 4/2003 | Rebh | |
| 2003/0160811 A1 | 8/2003 | Zigler | |
| 2003/0184498 A1 | 10/2003 | Blumberg et al. | |
| 2003/0185232 A1 * | 10/2003 | Moore et al. | 370/465 |
| 2004/0068567 A1 * | 4/2004 | Moran et al. | 709/227 |
| 2004/0122965 A1 * | 6/2004 | Apfel | 709/232 |
| 2004/0157586 A1 * | 8/2004 | Robinson et al. | 455/412.1 |

(Continued)

*Primary Examiner*—Saleh Najjar
*Assistant Examiner*—Farzana Huq
(74) *Attorney, Agent, or Firm*—DeLio & Peterson, LLC; Kelly M. Novak; Ronald Kaschak

(57) ABSTRACT

A remote control instant messaging method and system for automatically activating an instant messaging session based upon remote detection of a user approaching a processor capable of executing an instant message system. The method and system also automatically deactivate the instant messaging session based upon remote detection of the user's absence from such processor and automatically re-activate the instant messaging session based upon remote detection of the user's return to the processor. A second instant messaging session can also be remotely activated on a second processor operated by another user_id by detecting the first user's approach to such second processor. The first user is automatically disengaged from this second instant messaging session when the user leaves the location of the second processor.

19 Claims, 2 Drawing Sheets

U.S. PATENT DOCUMENTS

2004/0171396 A1* 9/2004 Carey et al. ................. 455/466
2004/0202117 A1* 10/2004 Wilson et al. ............... 370/310
2004/0205191 A1* 10/2004 Smith et al. ................. 709/227
2006/0009243 A1* 1/2006 Dahan et al. ................ 455/466

* cited by examiner

RFID WIRELESS CONTROL OF INSTANT MESSAGING

BACKGROUND OF THE INVENTION

1. Field of the Invention

The present invention is directed generally to real-time communication via data networks, and in particular, to methods and apparatus for automatically controlling activation and deactivation of instant messaging across cellular and public or private data networks.

2. Description of Related Art

Instant Messaging is a known means of real-time communication between users at remote data network communication devices. Traditional instant messaging systems operate through computer-based systems hardwired to the Internet, whereby instant messaging software enables the users to communicate with and be alerted when friends, family, colleagues and the like go on-line for real-time communication. More recently available instant messaging systems include wireless and non-wireless instant message communication environments. An instant messaging subscriber of these more current instant messaging systems can send and receive instant messages by means of a mobile unit device, such as a cell phone. Messages received may originate from a computer on a public data network, such as the Internet, or from other mobile unit devices. Other more recent wireless and non-wireless instant message environments include those that send and receive messages by means of a command-line interface.

Whether the instant messaging systems are through computer-based systems or wireless and non-wireless environments, the instant messaging software may be preinstalled in such data network systems, or a user may download or installing such software. Once provided with the instant messaging software, a user of the system must register a personal identifier for distinguishing himself from other users of such instant messaging software. The user is then able to exchange real-time messages with other users of the instant messaging software. In the more traditional computer-based systems, instant messaging allows users to exchange messages in one window without interrupting task(s) in progress in other windows. It is also a valuable resource for allowing colleagues in different geographical locations to quickly and easily communicate in real time for exchanging information, ideas and collaborate together on any given project.

In instant messaging systems, when a first user desires to instant message a second user, the first user generally clicks on a send instant message button and a window such as a buddy list window (list of other users of interest to the particular user, e.g. friends, colleagues, groupings of members, and the like) or database of other users appears for selection of such second user. A chat window allows the first user to compose messages in a message composition area, which is then sent to the selected second user for real-time instant message communication. Alternatively, when a second user identified in a first user's buddy list comes on-line or into the instant message session, this second user's personal identifier may appear to the first user via his data network hardware such as, for example, in a graphical user interface window (GUI) on the first user's data network system. The first user may then initiate a real-time instant messaging conversation with the second user by selecting, e.g., clicking-on, the second user's personal identifier.

Once an instant messaging session has been initiated, there can be several users simultaneously within the instant messaging session. However, when a user within such session decides to take a break from the session, be temporarily unavailable or exit the instant message session, the user must manually alert other users within such session that he will be temporarily unavailable and unable to answer any instant messages sent to him or must physically sign-out of the session. However, users often forget to indicate to other participants within the instant message session that such user will be temporarily unavailable, or even forget to sign-out. This creates the mistaken impression that the user is still working on his terminal and is available to respond to any sent instant messages. When participants within the instant message session send this user a number of instant messages, which are repeatedly unanswered by the user, the other participants will get the impression that the user is no longer participating within the instant message session, and as such, will no longer send the user any messages (even though the user may have returned to his terminal). In instances where the user remembers to alert the other participants within the instant message session that he will be "temporarily unavailable," often such user forgets to remove the "temporarily unavailable" indicator or inform the other participants that he is once again available to receive and answer instant messages. In addition to the above problems associated with instant messaging, when a user physically visits another participant within the instant message session that is actively participating within such session, the user is not able to initiate a simultaneous, separate instant message account for such session on the other participant's terminal.

Accordingly, it would be beneficial to provide a method and system for automatically detecting when a participant of an instant message session is unavailable or available for exchange of real-time messages within such session, and to remotely activate or deactivate such participant's instant messaging session based upon the detected availability status of the participant. The method and system would also allow two participants of an instant message session to actively and simultaneously participate within the same instant message session on a single terminal under two separate instant message accounts.

SUMMARY OF THE INVENTION

Bearing in mind the problems and deficiencies of the prior art, it is therefore an object of the present invention to provide a method and system for remotely controlling an instant messaging session based upon detection of a participant's availability to participate within such session.

It is another object of the present invention to provide a method and system that easily, affordably, and automatically remotely controls a user's instant messaging session.

A further object of the invention is to provide a method and system that allows two participants of an instant message session to actively and simultaneously participate within the same instant message session on a single terminal under two separate instant message accounts.

Still other objects and advantages of the invention will in part be obvious and will in part be apparent from the specification.

The above and other objects, which will be apparent to those skilled in art, are achieved in the present invention, which, is directed to a method for controlling instant messaging. The method includes providing both a data network communication device capable of executing an instant messaging session, and a receiving device connected to the data network communication device. A signal is emitted from a wireless signaling device on a user's person, whereby the instant messaging session is remotely controlled based upon the receiving device detecting and receiving the signal from the wireless signaling device. The data network communication device may include a computer-based system connected to a network, a non-wireless instant message communication environment or even a wireless instant message communication environment. The wireless signaling device may include a radio frequency identification device, a magnetic badge, token, radio connection or infrared, while the receiving device may include a radio frequency identification device, infrared or a radio receiver.

In so doing, the receiving device may detect the emitted signal, and transmit this signal to the data network communication device to indicate that the user is present at such communication device. The instant messaging session is then activated based upon such detection of the user's presence at the data network communication device. This instant messaging session may continue for as long as the user's presence is detected at the data network communication device. A lack of the signal being detected by the receiving device indicates that the user has moved away from the data network communication device or is no longer within the proximity of such communication device. The instant messaging session is then deactivated based upon this determination of the user's absence at the data network communication device.

In this aspect of the invention, wherein the user comprises a first user, the method further includes determining the data network communication device is the first user's personal data network communication device or a second data network communication device belonging to a second user. Wherein it is a second data network communication device, as the first user approaches this second communication device the first user's emitted signal is received at this second communication device, whereby the signal includes a unique identification of the first user and a unique identification of the first user's data network communication device. A request for the first user's instant message session information is transmitted to the first user's personal data network communication device and retrieved therefrom by the second data network communication device. Using this retrieved information, the first user's instant messaging session is activated on the second data network communication device, and of the first user's instant messages are directed to the second data network communication device.

The first user and second user may simultaneously participate in instant messaging sessions on the second data network communication device under separate user identifications. As the first user moves away from the second data network communication device, a lack of the signal emitted from the wireless signaling device on the first user's person at the second data network communication device triggers deactivation of the first user's session on this second communication device. The first user's instant messaging session is ended at the second data network communication device.

If, however, the data network communication device comprises the first user's personal data network communication device, as the first user moves away from his personal data network communication device, a lack of the signal emitted from the wireless signaling device on the first user's person at the user's personal data network communication device triggers deactivation of the first user's session his personal communication device. A message is then sent to the instant messaging session running on the first user's personal communication device to indicate the first user's unavailability status in such instant messaging session. At this point, it is the user's decision as to whether he is to end or not end his instant messaging session running on the user's personal data network communication device.

As the first user approaches another data network communication device, the receiving device at this third data network communication device detects the signal emitted from the wireless signaling device on the first user's person. The signal is transmitted to the third communication device to indicate the user's presence, and the first user's instant messaging session is re-activated at this third data network communication device, thereby indicating the first user's availability status in the instant messaging session. In this aspect, this communication device that the user has approached may be the first user's personal data network communication device, the second data network communication device or even a new data network communication device.

In another aspect, the invention is directed to remotely controlled instant messaging system. The system includes a data network communication device capable of executing an instant messaging session, a receiving device connected to the data network communication device and a wireless signaling device on a user's person. This wireless signaling device emits a signal. The system also includes a program of instructions on the data network communication device for remotely controlling operation of the instant messaging session based upon the receiving device detecting the signal from the wireless signaling device on the user's person.

In still another aspect, the invention is directed to a processor capable of executing instructions, tangibly embodying a program of instructions executable by the processor to perform method steps for remotely controlling instant messaging. The method steps include providing both a data network communication device capable of executing an instant messaging session and a receiving device connected to the data network communication device. A signal is emitted from a wireless signaling device on a user's person, whereby the instant messaging session is remotely activated based upon the receiving device receiving the signal from the wireless signaling device on the user's person. The instant messaging session is then remotely deactivated based upon a lack of the signal being detected by the receiving device.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
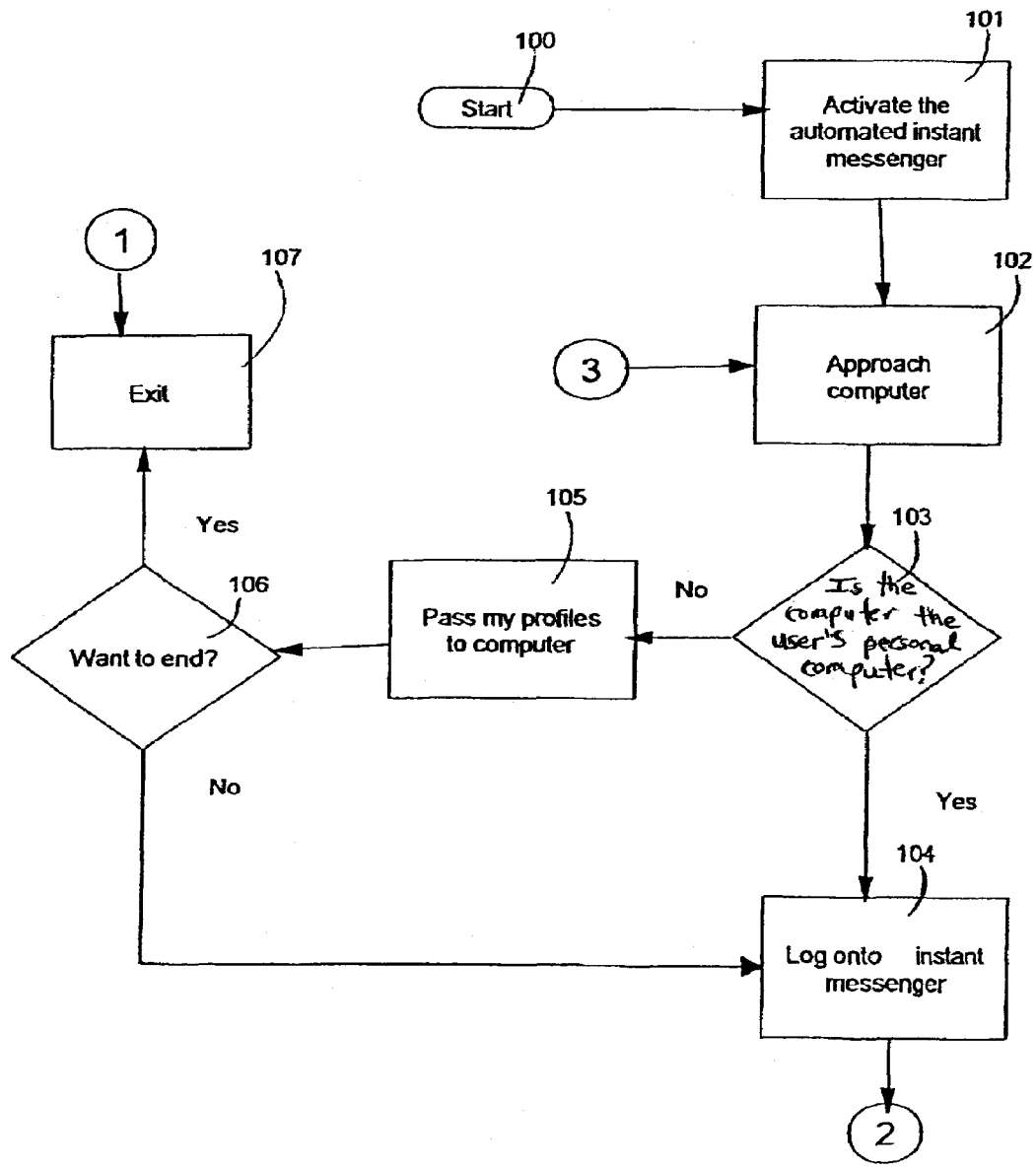
FIG. 1 is a flow diagram illustrating the method steps of the present invention of remotely controlling the activation and deactivation of an instant messaging system.

In describing the preferred embodiment of the present invention, reference will be made herein to FIGS. 1-2 of the drawings in which like numerals refer to like features of the invention.

The present invention provides a method and system for remotely controlling operation (i.e., activation or deactivation) of a user's instant messaging session occurring on a remote data network communication device. The user's instant messaging session is controlled by either activating or deactivating the instant message session based upon, respectively, the user's physical presence or absence from the physical location of the remote data network communication device. The invention also allows two participants of an instant message session to actively and simultaneously participate within the same instant message session on a single remote data network communication device under either a single or two separate windows and under two separate instant message accounts based on user identifications. The invention also allows users two or more users of the present instant messaging system to actively and simultaneously participate in different instant message sessions on a single computer.

The remotely controlled instant messaging system of the invention includes a data network communication device having installed software of the invention for running an instant messaging session. The data network communication device is able to both receive and send instant messages. A variety of data network communication devices may be used in accordance with the invention including, but not limited to, instant messaging systems operated through computer-based systems hardwired to the Internet, wireless instant message communication environments (e.g., a cell phone), non-wireless instant message communication environments and the like. The data network communication device is adapted to exchange real-time instant messages, whether they are text messages, voice messages, video messages, and the like, or even combinations thereof.

Also components of the remotely controlled instant messaging system are a wireless signaling device and a receiving device. The wireless signaling device may include, but is not limited to, a Radio Frequency Identification Device (RFID), a magnetic badge, token, radio connections, infrared or any other wireless device. For example, radio connections that may be used in accordance with the invention include, but are not limited to, Ethernet, Bluetooth®, and the like. An essential feature of the wireless signaling device is that it includes unique digital profile information for each user of the invention and a unique identification for each user's personal computer for distinguishing users of the invention from one another, as well as their respective personal computers from one another. This wireless signaling device is adapted to emit a wireless signal, which includes the unique user identifications and unique personal computer identifications. The wireless signaling device is on the user's person, that is, it is worn, carried, attached to, or in some manner physically connected to the user's person. As such, the wireless signaling device may be contained in or made a part of an identification badge, credit card, watch, locket, ring, pin, belt, personal digital assistant (PDA), cell phone, or any other device or article of clothing that is somehow on the user's person.

The receiving device of the present remotely controlled instant messaging system is adapted to receive the signal emitted from the wireless signaling device. In accordance with the invention, the receiving device is connected to the data network communication device by being integrally formed therewith, physically attached to such data network communication device or connected to the communication device (whether physical or remotely connected). For example, the receiving device may be a stand-alone unit in close proximity and connected to the data network communication device by being physically connected to the data network communication device by wires, or remotely connected through known wireless connections. The receiving device is adapted to receive the emitted signal from the wireless signaling device, and transmit this digital information to the data network communication device for analysis thereof, to determine whether the instant messaging session will be activated, deactivated, and/or the session or system exited. In so doing, the receiving device may include, but is not limited to, RFID, Infrared, radio receivers and the like.

The method of the present instant messaging system for remotely and automatically activated and deactivated instant messaging is started (step 100) and the automated instant messenger is initially activated (step 101). At this point, the data network communication device has software installed thereon for running instant messaging sessions, the receiving device is either connected to the data network communication device or is an integral part thereof, and the user of the invention has on his person the wireless signaling device that uniquely identifies such user from other users of the invention as well as identifies the user's personal computer.

As the user, having the wireless signaling device on his person, approaches the data network communication device, and is within a detectable range of the receiving device and the data network communication device, the unique signal being emitted from such wireless signaling device, which is transmitted via radio waves or any other form of wireless communication, is detected by the receiving device. This detected wireless signal is then transferred via the receiving device to a central process unit of the data network communication device that is driving the instant message session. (Step 102.)

If the processor determines that this data network communication device belongs to the user (step 103), then the user is logged onto the system (step 104) and the user's instant messaging session is automatically and remotely activated (step 201). As long as the user remains within the proximity or location of the data network communication device (which is based upon the continuing detection of the signal emitted from the wireless signaling device on the user's person), the user may continue to access the instant messaging session at this data network communication device (steps 202 and 201). However, once the receiving device no longer detects the user's emitted signal from his wireless signaling device (step 202), then this lack of an emitted signal from the user's wireless signaling device triggers the central processing unit of the data network communication device to deactivate the instant message session running on this data network communication device. If the data network communication device belongs to the user, the user's unavailability status is indicated (steps 203 and 205). At this point the user can either exit the system (steps 206 and 107), or approach a data network communication device running an instant message session (steps 206 and 102). If the user once again approaches a data network communication device on which the invention is running, and the user's emitted signal from his wireless signal device is detected and transmitted to such communication device, it must then be determined whether this data network communication device belongs to the user or does not belong to the user (steps 102, seq.) In either event, once the user has been logged onto such data network communication device the user's instant messaging session is activated and the user's availability status is indicated (steps 104, seq.).

Alternatively, rather than it being determined that the data network communication device belongs to the user in step 103, it may be determined by the processor of the data network communication device that such communication device does not belong to the user (step 103). In this event, the emitted signal from the wireless signaling device on the user's person is received by the receiving device of this other (or second) data network communication device, and transferred to such communication device's processor. The processor of the other (or second) data network communication device, analyzes the profile information for both the user's unique identification information as well as the unique identification information of the user's personal data network communication device. When this data network communication device receives and analyzes such profile information, a transaction is sent to the server that controls the instant messaging of the user, and an instant message session is activated on this other (or second) data network communication device, which may be a second instant message session running on the same second data network communication device (i.e., two or more users of the invention may actively run and participate in different or the same instant message sessions, under the same or different windows, on a single data network communication device). In so doing, the instant messages, which were to be sent to the user's personal data network communication device, are diverted to this other (or second) data network communication device. (Steps 105, seq.) When the user (visitor) leaves the proximity of the second communication device, the lack of a signal from the user's (visitor's) wireless signaling device will deactivate this second instant messaging session (steps 202, seq.)

It should be appreciated that the present invention may be embodied as a computer program product stored on a program storage device. The program storage devices of the present invention may be devised, made and used as a component of a machine utilizing optics, magnetic properties and/or electronics to perform the method steps of the present invention. Program storage devices include, but are not limited to, magnetic media such as a diskette or computer hard drive, magnetic tapes, optical disks, Read Only Memory (ROM), floppy disks, semiconductor chips and the like. A computer readable program code means in known source code may be employed to convert the methods described below for use on a computer.

Figure 2:
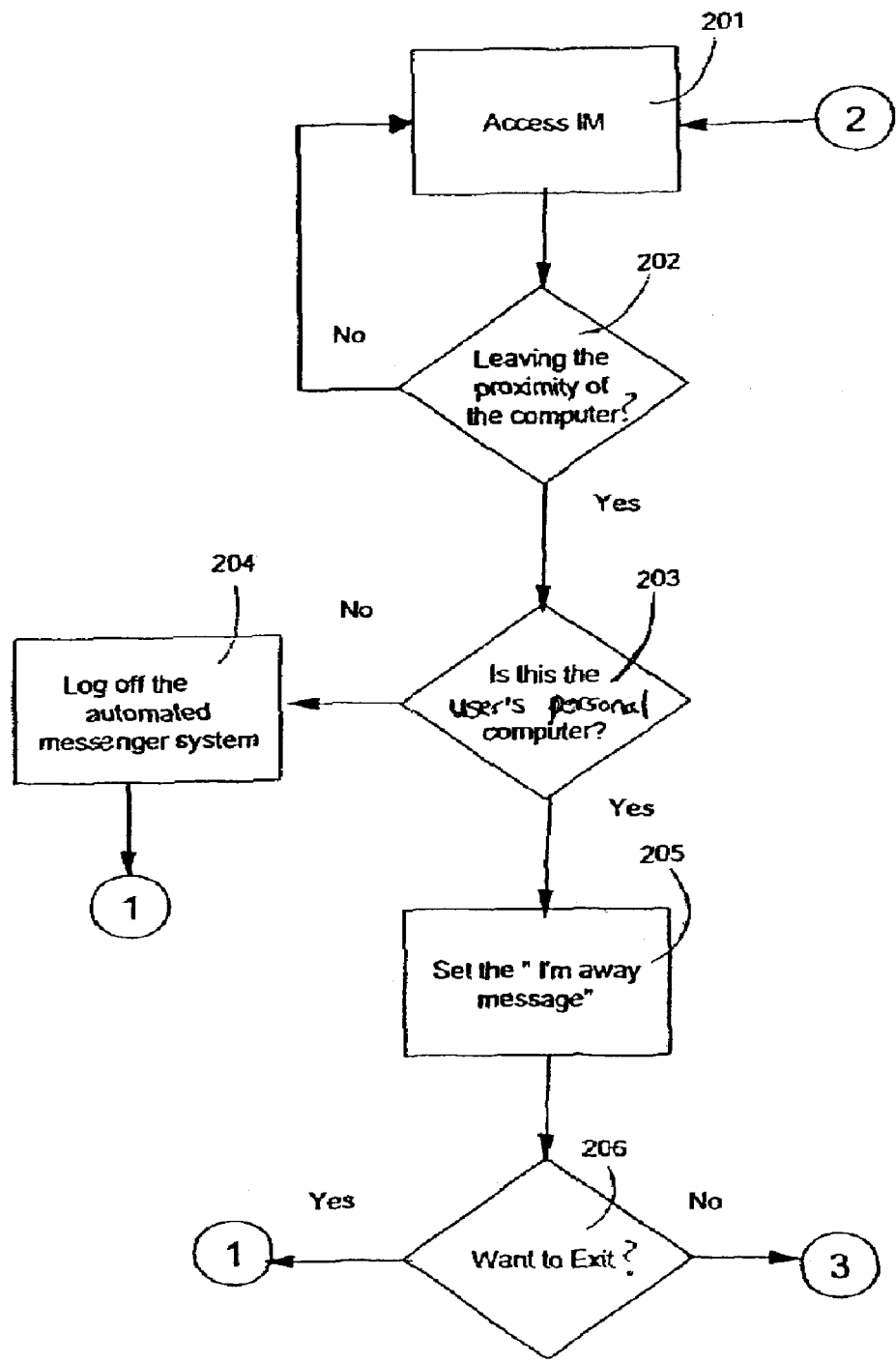
FIG. 2 is a flow diagram continuing the method steps of FIG. 1 for remotely controlling the activation and deactivation of an instant messaging system.

Flow charts of the process used in the present invention are shown in FIGS. 1 and 2. Numerals in circles indicate connections to and from other parts of the flow chart. FIG. 1 illustrates the method steps of the present invention of remotely controlling the activation and deactivation of an instant messaging system.

For ease of understanding the invention, FIGS. 1 and 2 are described in relation to exchanging real-time text instant messaging systems operated through computer-based systems. However, it should be appreciated and understood that the present invention may be used in conjunction with a variety of remote data network communication devices for exchanging real-time instant messages, whether they be text messages, voice messages, video messages, and the like, or even combinations thereof. Remote data network communication devices for use in accordance with the invention include, but are not limited to, instant messaging systems operated through computer-based systems hardwired to the Internet, wireless instant message communication environments and non-wireless instant message communication environments.

FIG. 1 illustrates the method steps of the present invention of remotely controlling the activation and deactivation of an instant messaging system, and the flow chart description is as follows:

Start. Start the process. Go to step 101.

Activate the automated instant messenger. Software installed in the user's computer (i.e., the user's data network communication device) initially activates the present automated instant messenger system by a user of the system turning on the computer, or alternatively, directing a command to start the system. Go to step 102.

Approach computer. The system detects the physical presence of the user as he approaches the proximity or vicinity within which the present computer is located on which the automated instant messaging system is running. This is accomplished by the user having the wireless signaling device on the user's person, whereby once within a detectable range of the receiving device, the wireless signaling device emits a signal that is received by the receiving device and transmitted to the instant messaging system running on the computer. The transmitted wireless signaling device includes unique digital profile information identifying each the particular user and the user's personal computer. The user unique identification and the computer unique identification each uniquely identifies the particular user and his personal computer, and distinguishes such user and his personal computer from other users and computers participating in and running the automated instant messaging system of the invention. In the preferred embodiment, an RFID tag is attached to the user with an RFID reader connected to the computer for transferring profile information to the computer for analysis. The process continues to step 103.

Is the computer the user's personal computer? Once the wireless signal has been emitted from the wireless signaling device, received by the receiving device and transmitted to the computer, the computer analyzes the computer of step 102 running the present automated instant messaging system at which the user is in close proximity to, and determines whether or not this computer is the personal computer belonging to the user. In so doing, the computer analyzes the unique digital profile information transmitted in the signal from the wireless signaling device and compares it to the present computer currently running the instant messaging system to determine whether the present computer is the user's personal computer. If it is determined that the computer of step 102 is in fact the user's personal computer, then the process flow continues to step 104. If the computer of step 102 is not the user's personal computer, then the process flow goes to step 105.

Log onto instant messaging session. If it has been determined that the user approaching the computer of step 102 is the owner of such computer, i.e. it is the user's personal computer, an instant message session is automatically logged onto or activated by the present automated instant messaging system, such that the user is able to send and receive instant messages on his personal computer. Alternatively, if the user approaching the computer of step 102 is not the owner of such computer, the user's profile information is passed to this present computer (see step 105 below) and then it is determined whether or not the user wants to end the current instant messaging session on the present computer (see step 106 below). If the user wants to end the system or session, the process flow continues to step 107 and the process ended. If, however, the user decides to continue with the system or session, then an instant message session is automatically logged onto or activated by the present automated instant messaging system in this step 104. In either event, whether the user is the owner or not the owner of the present computer, once the user is logged onto a current instant messaging session, the process flow continues to step 201.

105 Pass my profiles to computer. If it has been determined that the user approaching the computer of step 102 is not the owner of such computer, i.e., it is another computer currently running the system, then the profile information contained within the wireless signaling device that has been received by the receiving device and transmitted to this other computer, is stored within this other computer for directing all of the user's instant messages to the present computer at which the user is currently located. In so doing, the profile information contained within the wireless signaling device preferably includes at least the IP address of the user's personal computer and any password needed to gain access to the user's instant messaging system on his personal computer. This information is passed to the server that controls the instant messaging program, stored therein and logs the user into the automated instant messaging system at this other computer not belonging to the user. The system than enables all instant messages sent to the user to be directed, received and responded to at this other computer at which the user is physically located. Further, in accordance with the invention, the user's instant messaging session running on this other computer may be run simultaneously with another user of the present invention. That is, at least two, and even more, users of the present automated instant messaging system may simultaneously run and participate in instant messaging sessions on a single computer at which the first user and second user are physically located, whereby each user is uniquely identified from each other based on their respective different personal user_ids. Go to step 106.

106 Want to end? It is then determined whether or not the user desires to end the automated instant messaging session. If the user does not want to end the current instant messaging session, then the process flow continues to step 104 for allowing the user to log onto the instant messaging session. On the contrary, if the user desires to end the current instant messaging session, then the process flow goes to step 107.

107 Exit. End the automated instant messaging session on the present computer.

FIG. 2 illustrates the method steps of continuing the method of FIG. 1 for remotely controlling the activation and deactivation of an instant messaging system, and the flow chart description is as follows:

201 Access IM. Once the user is logged onto a current instant messaging session (from step 104), the user accesses the instant messages from the instant messenger on the computer and responds to the instant messages. Go to step 202.

202. Leaving the proximity of the computer? It is then determined whether the user is physically leaving or remaining within the proximity or vicinity within which the present computer is located on which the user is currently participating in the current instant message session. This is accomplished, respectively, by the receiving device either receiving or not receiving the signal emitted from the wireless signal device on or associated with the user's person. In so doing, if the receiving device continues to receive the signal emitted from the wireless signal device on the user's person, the present invention recognizes this signal receipt as an indicator that the user is not leaving the proximity of the present computer on which the user is currently actively participating within such instant messaging session. In this event, the process flow repeats to step 201 and the user is allowed to continue to access the instant messaging session, for both receiving and sending instant messages, for a period as long as the user remains within the proximity of the present computer. If, however, the receiving device no longer receives the signal emitted from the wireless signal device on or associated with the user's person, the invention recognizes this non-receipt of signal as an indicator that the user is no longer physically present at the location of the present computer on which the user was participating within the instant messaging session, and the process flow continues to step 203.

203 Is the present computer the user's personal computer? Once it is determined that the user has left the physical proximity or location of the present computer on which the user was participating within the instant messaging session, it is then determined whether such present computer was, or was not, the user's personal computer. This may be accomplished using the user's unique personal profile information emitted from the wireless signal device, received by the receiving device, transferred to the computer, and analyzed at the present computer. If it is determined that the present computer is not the user's personal computer, then the process flow continues to step 204. Alternatively, if the present computer is in fact the user's personal computer, then the process flow continues to step 205.

204 Log off the automated messenger system. When the user of the invention leaves the proximity or location of the present computer, which is not the user's personal computer, the user is automatically logged off the present automated instant messaging system of the invention. The process flow then continues to step 107 and the system is exited.

205 Set I'm away message. If in step 203 it is determined that the present computer is in fact the user's personal computer, then once it is determined that the user has physically removed himself from the proximity or location of his personal computer on which the current instant messaging session is running, the system automatically deactivates the current session and indicates the user's availability status by setting a message on the instant messaging system indicating that the user is unavailable, such as an "I'm away from the terminal" text message. The process flow then continues to step 206.

206 Want to exit. Once the current session has been deactivated by the user leaving the proximity of the present computer, the system then determines whether the user desires to exit the current instant messaging session, or alternatively, continue the current instant messaging session. If the user desires to exit the current instant messaging session on the present computer, the process flow continues to step 107 and the session and system are exited. Alternatively, if the user desires to continue participating within the current instant messaging session on his personal computer, the process flow continues to step 102. In step 102, as the user once again approaches a computer running the automated instant messaging system of the invention, the wireless signaling device on the user's person emits the signal identifying the particular user. Once within a detectable range, this emitted signal is received by the receiving device and transmitted to such computer. Once the computer receives and analyzes the emitted signal, the system automatically reactivates the user's current instant messaging session and removes the "I'm away from the terminal" text message, and/or indicates the user's availability status by setting a message on the instant messaging system indicating that the user is available, such as an "I'm back" text message. The process flow described above is then repeated such that this computer that the user has approached, after his unavailability status has been indicated at his personal computer, may once again be the user's personal computer, or it may be another computer (steps 105 and forward) that does not belong to the user.

Accordingly, the present instant messenger system is automatically and remotely activated and deactivated using software that detects, respectively, the presence of a user of the invention in close proximity to a computer (i.e., data network communication device) via an emitted signal from a wireless signaling device on the user's person, or the absence of a user of the invention via lack of an emitted signal from a wireless signaling device on the user's person. The automated instant messenger system also allows for the startup of an instant message session on a second computer (not belonging to the user) when the user of the invention approaches this second computer. That is, the invention advantageously enables a user of the foregoing remotely controlled instant messenger system to automatically disengage from an instant message session when leaving a computer, automatically activate an instant message session when returning to the computer, automatically activate a second instant message session when approaching another computer being operated by another user_id, and to automatically disengage from the such second instant message session when leaving the proximity of the second computer.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for controlling instant messaging comprising:
    providing a data network communication device running an instant messaging session;
    providing a receiving device connected to said data network communication device;
    providing a wireless signaling device residing on a user having a unique identification for said user;
    emitting a signal from said wireless signaling device residing on said user, said signal including said unique identification for said user; and
    remotely controlling participation of said user within said instant messaging session running on said data network communication device based upon said receiving device receiving said signal from said wireless signaling device residing on said user whereby,
        when said user is within physical proximity to said data network communication device, said receiving device receiving said signal emitted from said wireless signaling device and transferring said signal to said data network communication device for automatically identifying said user and activating said user's instant messaging session for indicating said user as currently available for participation within said instant messaging session running on said data network communication device, and
        when said user is not within physical proximity to said data network communication device, deactivating said user's instant messaging session.

2. The method of claim 1 further including continuing said user's instant messaging session as long as said user's presence is detected at said data network communication device.

3. The method of claim 2 wherein as said user moves away from said receiving device, said step of controlling said instant messaging session further comprising the steps of:
    a lack of said signal being detected by said receiving device, whereby said lack of said signal transmission to said data network communication device indicates said user's absence at said data network communication device; and
    indicating said user as currently unavailable for participation within said instant messaging session by deactivating said user's instant messaging session on said data network communication device based upon detection of said user's absence at said data network communication device.

4. The method of claim 1 wherein said user comprises a first user, said method further including the step of determining whether said data network communication device is said first user's personal data network communication device or a second data network communication device belonging to a second user.

5. The method of claim 4 wherein said data network communication device comprises said second data network communication device belonging to said second user, the method further comprising the steps of:
    said second data network communication device receiving said emitted signal from said wireless signaling device residing on said first user, said signal including said unique identification of said first user and a unique identification of said first user's data network communication device;
    transmitting a request from said second data network communication device for profile information contained within said wireless signaling device, said profile information at least including said unique identification of said first user's data network communication device and any password needed to gain access to said first user's instant messaging session;
    receiving said requested profile information at said second data network communication device;
    activating said first user's instant messaging session on said second data network communication device using said profile information; and
    directing all of said first user's instant messages to said second data network communication device.

6. The method of claim 5 wherein said first user and said second user simultaneously participate in instant messaging sessions on said second data network communication device under separate user identifications.

7. The method of claim 5 wherein as said first user moves away from said second data network communication device, said method further comprising the steps of:
    said receiving device connected to said second data network communication device receiving a lack of said signal from said wireless signaling device on said first user;
    deactivating said first user's instant messaging session on said second data network communication device based upon detection of said first user's absence from said second data network communication device; and
    ending said first users s instant messaging session at said second data network communication device.

8. The method of claim 4 wherein said data network communication device comprises said first user's personal data network communication device, the method further comprising the steps of:
    said receiving device connected to said first user's personal data network communication device receiving a lack of said signal from said wireless signaling device on said first user;
    deactivating said first user's instant messaging session on said first user's personal data network communication device based upon detection of said first user's absence from said first user's personal data network communication device; and
    sending a message to said instant messaging session to indicate said first user's unavailability status in said instant messaging session.

9. The method of claim 8 further including the step of ending said first user's instant messaging session at said first user's personal data network communication device.

10. The method of claim 8 further including the steps of:
    said first user approaching a third data network communication device;

said receiving device of said third data network communication device detecting said signal emitted from said wireless signaling device on said first user;

transmitting said signal from said receiving device to said third data network communication device to indicate said user's presence at said third data network communication device;

re-activating said first user's instant messaging session on said third data network communication device based upon detection of said user's presence at said third data network communication device; and indicating said first user's availability status in said instant messaging session.

11. The method of claim 10 further including continuing said first user's instant messaging session at said third data network communication device as long as said user's presence is detected at said third data network communication device.

12. The method of claim 10 wherein said third data network communication device is selected from the group consisting of said user's personal data network communication device, said second data network communication device and a new data network communication device.

13. The method of claim 1 wherein said data network communication device is selected from the group consisting of a computer-based system connected to a network, a non-wireless instant message communication environment and a wireless instant message communication environment.

14. The method of claim 1 wherein said wireless signaling device is selected from the group consisting of a radio frequency identification device, a magnetic badge, token, radio connection and infrared.

15. The method of claim 14 wherein said receiving device comprises a receiver selected from the group consisting of a radio frequency identification device, infrared and a radio receiver.

16. A remotely controlled instant messaging system comprising:

a data network communication device running an instant messaging session;

a receiving device connected to said data network communication device;

a wireless signaling device residing on a user having a unique identification for said user, said wireless signaling device emitting a signal that includes said unique identification for said user; and a program of instructions on said data network communication device for remotely controlling participation of said user within said instant messaging session running on said data network communication device based upon said receiving device detecting said signal from said wireless signaling device residing on said user whereby, when said user is within physical proximity to said data network communication device, said receiving device receiving said signal emitted from said wireless signaling device and transferring said signal to said data network communication device for automatically identifying said user and activating said user's instant messaging session for indicating said user as currently available for participation within said instant messaging session running on said data network communication device, and when said user is not within physical proximity to said data network communication device, deactivating said user's instant messaging session.

17. The system of claim 16 wherein said program of instructions includes a first set of instructions for activating said instant messaging session on said data network communication device based upon said receiving device receiving said signal, which indicates said user's presence at said data network communication device.

18. The system of claim 17 wherein said program of instructions includes a second set of instructions for deactivating said instant messaging session on said data network communication device based upon a lack of detection of said signal by said receiving device, which indicates said user's absence at said data network communication device.

19. A program storage device readable by a processor capable of executing instructions, tangibly embodying a program of instructions executable by the processor to perform method steps for remotely controlling instant messaging, said method steps comprising:

providing a data network communication device running an instant messaging session;

providing a receiving device connected to said data network communication device;

providing a wireless signaling device residing on a user having a unique identification for said user;

emitting a signal from said wireless signaling device residing on said user, said signal including said unique identification for said user; and remotely controlling participation of said user within said instant messaging session running on said data network communication device based upon said receiving device receiving said signal from said wireless signaling device residing on said user whereby, when said user is within physical proximity to said data network communication device, said receiving device receiving said signal emitted from said wireless signaling device and transferring said signal to said data network communication device for automatically identifying said user and activating said user's instant messaging session for indicating said user as currently available for participation within said instant messaging session running on said data network communication device, and when said user is not within physical proximity to said data network communication device, deactivating said user's instant messaging session.

* * * * *

UNITED STATES PATENT AND TRADEMARK OFFICE
CERTIFICATE OF CORRECTION

PATENT NO. : 7,664,820 B2
APPLICATION NO. : 10/906992
DATED : February 16, 2010
INVENTOR(S) : Kelley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1077 days.

Signed and Sealed this

Seventh Day of December, 2010

David J. Kappos
*Director of the United States Patent and Trademark Office*